United States Patent Office 3,649,616
Patented Mar. 14, 1972

3,649,616
PROCESS FOR MAKING STARCH ETHERS
Arthur M. Goldstein, Plainview, Erwin M. Heckman, Long Beach, and Jay Harvey Katcher, Rego Park, N.Y., assignors to Stein, Hall & Co., Inc., New York, N.Y.
No Drawing. Filed Feb. 6, 1970, Ser. No. 9,403
Int. Cl. C08b 19/06
U.S. Cl. 260—233.3 R    5 Claims

ABSTRACT OF THE DISCLOSURE

Epihalohydrin amine reagents free of unreacted epihalohydrin are prepared by combining tertiary amine salts and epihalohydrin in approximately equimolar quantities, reacting them at about 30°–35° C. to form the reagent, and adding an increment of a strong alkali such as caustic or a tertiary amine followed by an additional period of reaction at about 30°–35° C. to consume unreacted epihalohydrin. Said reagent is added to starch to affect etherification thereof under nongelatinizing conditions.

---

This invention relates to a process for preparing gelatinizable starch ethers containing quarternary ammonium substituents and more particularly to an epihalohydrin amine reagent, free of unreacted epihalohydrin which is useful in preparing the starch ether. In addition, the invention is concerned with a process for making the amine reagent.

Starch ethers containing quaternary ammonium derivatives are known in the prior art, and it is also known to use the reaction product of an epihalohydrin and a tertiary amine or a tertiary amine salt in the preparation of these derivatives. As described in the Paschall patent, U.S. No. 2,876,217, these prior art products have a number of problems, and care must be taken to remove all unreacted epihalohydrin from the reaction product of the epihalohydrin and tertiary amine. Otherwise, the unreacted epihalohydrin reacts with granular starch under strongly alkaline pH conditions to form a cross-linked starch ether which is non-gelatinizable in boiling water. According to Paschall, it is impossible to obtain a substantially epihalohydrin-free reaction product of an epihalohydrin with a tertiary amine by controlling the reaction conditions. Paschall discloses that detrimental amounts of unreacted epihalohydrin can be removed from the reagent by subjecting an amine-epihalohydrin mixture to vacuum distillation or solvent extraction prior to using it as a starch derivatizing reagent. While this procedure is effective, the additional step of vacuum distillation or solvent extraction is time consuming and expensive.

It has now been found that an improved amine reagent can be prepared without recourse to the expensive steps of vacuum distillation or solvent extraction by providing for a two-stage process. In the first stage, the epihalohydrin and tertiary amine salt are combined in approximate equimolar amounts in an aqueous solution having a pH of about 8.5, and the components are reacted at about 30°–35° C. for about one hour, the pH dropping to about 7.9. In the second stage, additional amounts of a strong alkali such as caustic or a tertiary amine sufficient to adjust the pH to 8.5 and to react with the unreacted epihalohydrin is added and the reaction continued for an additional hour at the temperature of about 30°–35° C. The resulting reagent is substantially free of unreacted epihalohydrin and is ideally suitable for use with strongly basic catalysts in the preparation of quaternary ammonium derivatives of starch.

The reactions which occur in the process of the present invention are illustrated by the following equations, wherein trimethylamine and epichlorohydrin are employed as representative tertiary amine and epihalohydrin, respectively:

(a) 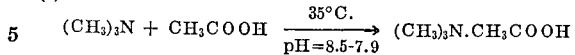

(b) 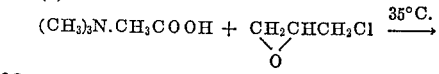

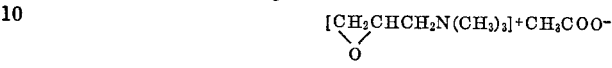

(c) Additional of strong alkali to product of reaction (b) above at 35° C. drives the reaction to completion leaving no residual epichlorohydrin.

(d) 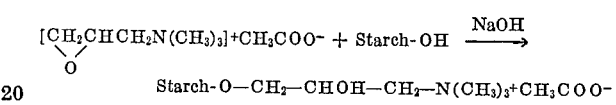

Starch-O—CH₂—CHOH—CH₂—N(CH₃)₃⁺CH₃COO⁻

The tertiary amines useful according to the present invention include tertiary amines of the formula

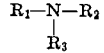

wherein $R_1$, $R_2$ and $R_3$ are radicals containing not more than 18 carbon atoms from the group consisting of alkyl, substituted alkyl, alkene, cyclic formed by joining two R's as previously defined, phenyl and monocyclic aralkyl and when all three R's are the same each is an alkyl group containing not more than 3 carbon atoms, and when all three R's are not the same and any R contains more than 3 carbon atoms, then the other two R's are each an alkyl group not larger than ethyl, and when two R's are joined to form a ring, then the third R is an alkyl group not larger than ethyl.

The preferred tertiary amines used in accordance with the invention possess at least two methyl groups attached directly to the nitrogen. These amines have superior reactivity to epihalohydrin. The following dimethyl tertiary amines may be used in carrying out this invention: trmethyl, dimethylbenzyl, dimethyldodecyl, trimethylstearyl, diethyl, N-ethyl and N-methylmorpholine, N-ethyl and N-methylpiperidine and methyldialkylamine. Trimethylamine is preferred.

In carrying out the process of the present invention, the tertiary amine or tertiary amine salt and epihalohydrin are mixed in equimolar quantities in an aqueous system, and the reaction is allowed to proceed with agitation until the reagent is formed. Where a tertiary amine salt is employed, the pH of the aqueous solution is about 8.5 at the beginning of the reaction and is about 7.9 when the reaction is complete after about one hour.

The temperature at which the reaction takes place is preferably within the range of about 30°–35° C. Higher temperatures will cause loss of reagent because of volatilization, while lower temperatures provide a greatly reduced rate of reaction. The reaction time used is that required to provide a stable reagent and generally is in the order of about one hour, after which the reagent is stable and can be stored.

Equimolar amounts of tertiary amine salt and epihalohydrin are preferably employed in the first stage of the process of this invention. Amounts of epihalohydrin in excess of this level are to be avoided as undesirable for reasons given above. Excess tertiary amine or tertiary amine salt may be used if desired, but are not required.

While any of the usual acids may be used to make tertiaryamine salts, including hydrochloric acid, the weaker acids, and acetic acid in particular, are preferred.

In the second step of preparing the reagent, an increment of a strong alkali sufficient to insure complete reaction of the unreacted epihalohydrin is added to the reaction mixture, and the reaction is continued until the unreacted epihalohydrin has been substantially completely consumed. Where the strong alkali is a tertiary amine, the pH is about 8.5 at the beginning of the reaction and gradually lowers to about 7.9. The preferred strong alkali used at this stage in the process is the same tertiary amine as was used in the first stage of the reaction. Caustic may also be used, and in this event, sufficient is added to raise the pH to about 9.4 at the beginning of the reaction.

The reagents prepared in accordance with the present invention are used to prepare starch derivatives in accordance with procedures which are non-gelatinizing and are well known to the art. A strongly alkaline catalyst, optionally with a gelatinizing retarding salt, is mixed with the reagent, and the mixture is dissolved in water with agitation for one to two hours at 35° C. Raw starch is then added to the solution as a slurry and is reacted with agitation preferably at a slightly elevated temperature and with increased amounts of catalysts. A typical reaction occurs at a pH of 11.2 and 45° C. for 17 hours. The starch is then neutralized with an edible acid to a pH of 5.0–6.0, washed, dewatered and dried to provide the desired starch ether.

Typical starches which can be used include potato, corn, tapioca, sago, wheat, rice, waxy maize and other granular starches, both raw and modified. Examples of suitable strongly basic catalysts include alkali metal hydroxides, alkaline earth oxides, hydroxides, and quaternary ammonium bases. Gelatinization or swelling retarding salts include $Na_2SO_4$, $Na_2CO_3$ and $MgSO_4$.

EXAMPLE I 350 parts of water is mixed with 24 parts of glacial acetic acid. A 25% water solution of trimethylamine is added until the pH of the mixture reaches 8.5. 37 parts of epichlorohydrin are then added and the mixture is reacted for one hour at 35° C.; the pH of the mixture is 7.9 at the completion of the reaction.

40 parts of a 25% aqueous solution of trimethylamine is then added, bringing the pH of the mixture to 8.5, and the mixture is reacted for an additional hour at 35° C.; the pH again returns to 7.9. In this manner, the reagent comprising the reaction product of the acetate salt of trimethylamine and epichlorohydrin is prepared. The reaction product is substantially free of unreacted epichlorohydrin.

In a starch reaction vessel, an aqueous solution of caustic is prepared containing 5.5 parts of sodium hydroxide, 50 parts of sodium sulfate and 250 parts of water. 180 parts of the reagent prepared above is added to the solution of caustic and sulfate, at which point the pH of the mixture is about 12.2. The reagent was reacted in the reaction vessel for two hours at 35° C.

300 parts of potato starch is added to the contents of the reaction vessel and the pH is measured to be 11.2. The temperature of the reaction vessel is adjusted to 45° C., and the mixture reacted at that temperature for 17 hours. The starch is then neutralized with hydrochloric acid to a pH of 5.0–6.0. The starch is then washed, dewatered by filtration and dried. Upon examination, the starch has a nitrogen content of about .24 as determined by the Kjeldahl method. A range of nitrogen contents of 0.20 to 0.28 provide starch ethers of acceptable characteristics.

EXAMPLE II

The process of Example I is repeated. Using corn and tapioca starches, the resulting starches have nitrogen contents by the Kjeldahl method of .25 and .28, respectively. Ranges of nitrogen contents of from .23 to .28 for corn starch ethers and .27 to .28 for the ethers of tapioca starch provide acceptable products.

We claim:

1. A process for preparing a cationic gelatinizable starch ether containing nitrogen and in unswollen granule form without the necessity of a separate step for the physical removal of unreacted epihalohydrin, which consists essentially of the steps of (a) forming a salt of a tertiary amine of the formula

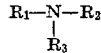

wherein $R_1$, $R_2$ and $R_3$ are radicals containing not more than 18 carbon atoms from the group consisting of alkyl, substituted alkyl, alkene, cyclic formed by joining two R's as previously defined, phenyl and monocyclic aralkyl and when all three R's are the same each is an alkyl group containing not more than 3 carbon atoms, and when all three R's are not the same and any R contains more than 3 carbon atoms, then the other two R's are each an alkyl group not larger than ethyl, and when two R's are joined to form a ring, then the third R is an alkyl group not larger than ethyl, (b) reacting the tertiary amine salt in aqueous medium with approximately equimolar quantities of epihalohydrin to form a reagent, (c) adding a strong alkali selected from the group consisting of sodium hydroxide and a tertiary amine as defined in paragraph (a) hereof, wherein sufficient strong alkali is added to adjust the pH of the mixture to within the range of about 8.5 to about 9.4 and sufficient to insure complete reaction with unreacted epihalohydrin, and allowing the reaction to proceed at a temperature of about 30–35° C. for about an hour, (d) combining the reagent of (c) with water and a strong basic catalyst to form a mixture, and, (e) adding the reagent to starch to affect etherification thereof under nongelatinizing conditions.

2. The process of claim 1, wherein the starch is selected from the group consisting of potato, tapioca and corn starches.

3. The process of claim 1, wherein the tertiary amine is trimethylamine and the acid used to form the salt thereof is acetic acid.

4. The process of claim 1, wherein a gelatinization retarding salt is added with the catalyst in step (d).

5. The process of claim 1, wherein the strong alkali of step (c) is trimethylamine and the amine is added in quantities to bring the pH of the mixture to about 8.5.

References Cited

UNITED STATES PATENTS

| 2,876,217 | 3/1959 | Paschall | 260—233.3 |
| 2,995,513 | 8/1961 | Paschall et al. | 210—54 |
| 3,243,426 | 3/1966 | Caesar | 260—233.3 |
| 3,422,087 | 1/1969 | Caesar | 260—233.3 |
| 3,448,101 | 6/1969 | Billy et al. | 260—233.3 |

DONALD E. CZAJA, Primary Examiner

M. I. MARQUIS, Assistant Examiner

U.S. Cl. X.R.

260—233.5 R, 348.6 R